United States Patent
Buczynski et al.

(10) Patent No.: US 10,132,993 B2
(45) Date of Patent: Nov. 20, 2018

(54) METHOD OF MANUFACTURING AN ACTIVE OPTICAL FIBRE AND THE ACTIVE OPTICAL FIBRE

(71) Applicant: INSTYTUT TECHNOLOGII MATERIALOW ELEKTRONICZNYCH, Warsaw (PL)

(72) Inventors: Ryszard Buczynski, Warsaw (PL); Dariusz Pysz, Warsaw (PL); Marcin Franczyk, Warsaw (PL); Mariusz Klimczak, Warsaw (PL); Rafal Kasztelanic, Nadarzyn (PL); Ryszard Stepien, Warsaw (PL)

(73) Assignee: INSTYTUT TECHNOLOGII MATERIALOW ELEKTRONICZNYCH, Warszawa (PL)

( * ) Notice: Subject to any disclaimer, the term of this patent is extended or adjusted under 35 U.S.C. 154(b) by 0 days.

(21) Appl. No.: 15/852,565

(22) Filed: Dec. 22, 2017

(65) Prior Publication Data

US 2018/0180801 A1 Jun. 28, 2018

(30) Foreign Application Priority Data

Dec. 22, 2016 (PL) .......................................... 419944

(51) Int. Cl.
*G02B 6/028* (2006.01)
*G02B 6/02* (2006.01)
(Continued)

(52) U.S. Cl.
CPC .... *G02B 6/02038* (2013.01); *C03B 37/01205* (2013.01); *C03B 37/01211* (2013.01);
(Continued)

(58) Field of Classification Search
CPC .. G02B 6/02038; G02B 6/02357; G02B 6/06; G02B 6/02361; G02B 6/02352; G02B 6/02323; C03B 37/01205
See application file for complete search history.

(56) References Cited

U.S. PATENT DOCUMENTS 4,397,524 A * 8/1983 Yoshimura ........ C03B 37/01214
359/900
4,799,949 A 1/1989 Keck et al.
(Continued)

FOREIGN PATENT DOCUMENTS

CA 2 454 884 A1 7/2004

OTHER PUBLICATIONS

Michel J. F. Digonnet, "Rare-Earth-Doped Fiber Lasers and Amplifiers", 2001, Marcel Dekker, Inc., New York.
(Continued)

*Primary Examiner* — Ellen Kim
(74) *Attorney, Agent, or Firm* — Hauptman Ham, LLP

(57) ABSTRACT

The invention relates to a method of manufacturing an active optical fiber having a cladding and a doped core, as well as the active optical fiber equipped with the cladding and the doped core. The active optical fiber according to the invention is adapted to conduct and generate radiation having a wavelength λ and is provided with a cladding and a core containing at least one active dopant, characterized in that the core comprises elongate elements made of a first type of glass having a first refractive index $n_1$ and elongate elements of a second type of glass having a second refractive index $n_2$, oriented along the optical fiber and forming a compact bundle, wherein transverse dimensions of the elongate core elements are smaller than ⅕ of the wavelength λ. Such optical fibers are used in laser generation and in amplification techniques.

20 Claims, 3 Drawing Sheets

Figure 1:
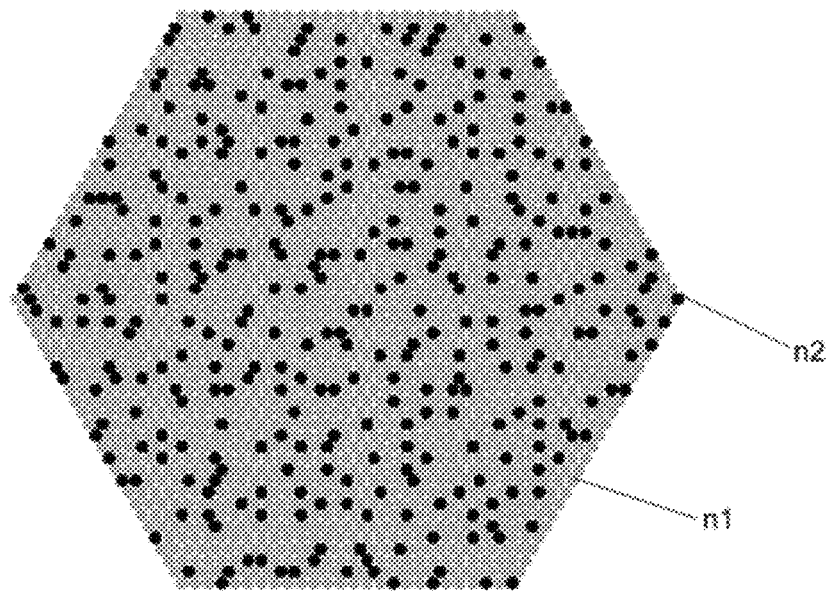

(51) Int. Cl.
*C03B 37/012* (2006.01)
*G02B 6/06* (2006.01)
*C03B 37/027* (2006.01)
*H01S 3/067* (2006.01)

(52) U.S. Cl.
CPC ........ *C03B 37/027* (2013.01); *G02B 6/02323* (2013.01); *G02B 6/02352* (2013.01); *G02B 6/02357* (2013.01); *G02B 6/02361* (2013.01); *G02B 6/06* (2013.01); *H01S 3/067* (2013.01); *C03B 2201/34* (2013.01); *C03B 2203/12* (2013.01); *C03B 2203/24* (2013.01); *C03B 2203/26* (2013.01)

(56) References Cited

U.S. PATENT DOCUMENTS

| | | | |
|---|---|---|---|
| 4,978,377 A | 12/1990 | Brehm et al. | |
| 5,942,296 A | 8/1999 | Oh et al. | |
| 7,289,707 B1* | 10/2007 | Chavez-Pirson | G02B 6/06 385/116 |
| 8,041,170 B2* | 10/2011 | Taru | C03B 37/0122 385/123 |
| 8,503,071 B2 | 8/2013 | Burov et al. | |
| 2005/0041944 A1 | 2/2005 | Cryan et al. | |
| 2008/0138022 A1* | 6/2008 | Tassone | G02B 6/02333 385/124 |
| 2009/0201575 A1* | 8/2009 | Fermann | H01S 3/06754 359/341.32 |
| 2015/0155678 A1* | 6/2015 | Jiang | H01S 3/06754 385/126 |

OTHER PUBLICATIONS

Polish Search Report dated Aug. 29, 2017 in connection with the counterpart Polish Patent Application No. P.419944.

\* cited by examiner

METHOD OF MANUFACTURING AN ACTIVE OPTICAL FIBRE AND THE ACTIVE OPTICAL FIBRE

CROSS REFERENCE TO RELATED APPLICATION

This application claims the priority of Polish Patent Application No. 419944 filed on Dec. 22, 2016. The entire disclosure of the above application is incorporated herein by reference.

The invention relates to a method of manufacturing an active optical fibre equipped with a cladding and a doped core, as well as the active optical fibre equipped with the cladding and the doped core. Such optical fibres are used in laser generation and in amplification techniques.

Single-mode optical fibres are used, among others, in laser technology. The threshold of destruction with high intensity light is one of the factors limiting the maximum power of a laser constructed using such fibres. The value of the destructive light intensity increases with the increase of the core cross-sectional area, and thus also with the increase of the core diameter.

Fulfilling the criterion for single-mode operation of each fibre, including an active fibre, depends on the diameter of its core and on the square root of the difference of the squares of the refractive indices of the cladding and the core. This implies the limitation of a possibility to increase the core diameter because as it increases, the difference between refractive indices of the cladding and the core should decrease, and possibilities to provide constant small differences in the case of the cladding and the core made of solid glass are limited. Usually, when solving design issues, designers accept the reduction of the cross-sectional area of the core so as to obtain preferable values of other parameters, such as in US patent document no. U.S. Pat. No. 8,503,071 B2.

The US patent document published under the number US 2005/0041944 A1 discloses an optical fibre having a core in form of a mosaic of rods having a diameter ranging from 1 µm to 5 µm, the rods being made of at least two different types of glass. Rods made of the first type glass have a higher refractive index, while the rods of the second type—a lower one. These rods are arranged so as to obtain a desired refractive index profile in the cross-section of the optical fibre.

The prior art solutions do not provide a single-mode operation of the optical fibre, wherein, independent modes can be created and propagated in individual fibres. These solutions also require very homogeneous doping of the glass, which is technologically difficult. The aim of the invention is to solve these problems.

The method according to the invention relates to manufacturing of an active optical fibre conducting and generating radiation having a certain wavelength $\lambda$. This method includes a step of preparing a core sub-preform of glass doped with an active dopant and a step of drawing the core sub-preform along with a cladding preform. The method according to the invention is characterised in that in the step of preparing the core sub-preform, a structural preform is compiled, said preform containing at least glass rods made of a first type of glass having a first refractive index and glass rods made of a second type of glass having a second refractive index arranged according to a selected pattern to provide an assumed refractive index profile. The second refractive index has a value higher than or equal to the highest value of the refractive index profile assumed for the core, and the value of the first refractive index is lower than or equal to the lowest value of the assumed refractive index profile in the core cross-section. Owing to this solution, an arbitrary profile can be obtained using only two types of glass, whereby the concentration of rod arrangement in the structural preform corresponds to the refractive index profile in the core cross-section.

Furthermore, at least the second type of glass contains at least one active dopant. The structural preform made in this manner is subjected to thinning by drawing in order to obtain a core preform. Dimensions of the glass rods and process parameters of the drawing of the structural preform and the sub-preform of the core with cladding are selected such that the rods thinned as a result of the drawing, and constituting core elements of the final fibre, have transverse dimensions smaller than ⅕ of the wavelength $\lambda$. Owing to such small transverse dimensions of the core elements, additional modes are not propagated therein. Control of the transverse distribution of the dopant in form of the designed and thinned structure of doped and non-doped glass rods enables to limit the phenomenon of dopant clustering. As a result, the absorption efficiency of pump radiation is increased in such a way that a higher number of absorbed photons cause stimulated emission than in case of presence of dopant clusters. This is because in dopant clusters the probability of non-radiative cross-relaxation is increased due to the small interatomic distances of the dopant. Furthermore, in technological processes of glass doping, it is difficult to obtain a material having constant parameters unchanged within its entire volume. Due to the use of numerous rods, any heterogeneities are averaged and the spread of parameters along the final fibre is decreased. This is important in view of doping and in view of tolerance of obtaining the assumed values of the refractive index profile in the core. In particular, small differences between the refractive indices for the cladding and the core can be obtained, which allows to provide single-mode operation in case of large transverse dimensions of the core.

Preferably, the sub-preforms obtained as a result of drawing the structural preform are cut into sections which are compiled into an intermediate structural preform and are again subjected to drawing in order to obtain the core sub-preform.

Preferably, the steps of cutting, arranging into the intermediate structural preform and re-drawing are repeated several times.

Preferably, both the first type of glass and the second type of glass are doped with at least one active dopant, the second type of glass being more stronger doped with said at least one active dopant.

Preferably, the refractive index profile is constant throughout the entire cross-section of the core.

Preferably, the cladding preform is made of rods made of non-doped glass, the rods being arranged in a glass tube and the non-doped glass being preferably the first type of glass.

Preferably, the rods made of the first type of glass and the rods made of the second type of glass are arranged in the structural preform in such a manner that the effective refractive index of the core is not more than 0.05% higher than the first refractive index. Such small differences enable a significant increase in the core area compared to typical solutions, while at the same time the single-mode operation is ensured.

At least one active dopant is preferably a dopant selected from the group comprising: erbium, praseodymium, ytterbium, neodymium, thulium and holmium, and it is particularly preferable to use at least two dopants. In double doping, a specific dopant and a so-called co-dopant are used. Ytterbium can be a co-dopant of any rare earth metal. It is also preferable to use a pair of co-dopant-dopant comprising thulium and holmium ions. In the solution according to the invention, it is possible to use double-doped glass rods or a set of glass rods doped with various dopants. In typical active optical fibres, the use of two dopants would involve technological difficulties, but owing to the method according to the invention, it is sufficient that the first type of glass is doped with a first active dopant, and the second type of glass is doped with a second active dopant. If this is necessary to obtain the desired refractive index profile, rods made of a third type of glass being free of active dopants are additionally used. This allows to use a broader range of values of the refractive index in the core.

The active optical fibre according to the invention is adapted to conduct and generate radiation having a wavelength $\lambda$. It is provided with a cladding and a core containing an active dopant. The active optical fibre according to the invention is characterised in that the core comprises elongate elements made of a first type of glass having a first refractive index and elongate elements made of a second type of glass having a second refractive index, oriented along the optical fibre and forming a compact bundle. Transverse dimensions of the elongate core elements are smaller than ⅕ of the radiation wavelength. The second refractive index $n_2$ has a value higher than or equal to the highest value of the refractive index profile in the core cross-section, and the first refractive index $n_2$ has a value lower than or equal to the lowest value of the refractive index profile in the core cross-section. At least the second type of glass is doped with an active dopant. Owing to such small transverse dimensions of the core elements, additional modes are not propagated therein. Due to the fact that no modes are propagated in the non-doped elongate elements of the core, a better interaction of radiation with the dopant is achieved. In technological processes of glass doping, it is difficult to obtain a material having constant parameters unchanged throughout its entire volume. As a result of using numerous rods, any heterogeneities are averaged and the spread of parameters along the final fibre is decreased. This is important in view of doping and in view of tolerance of obtaining the assumed values of the refractive index profile in the core. In particular, small differences between the refractive indices for the cladding and the core can be obtained, which allows to provide single-mode operation in case of large transverse dimensions of the core.

Preferably, both the first type of glass and the second type of glass are doped with at least one active dopant, the second type of glass being stronger doped with said at least one active dopant.

The elongate elements made of the first type of glass and the elongate elements made of the second type of glass are arranged into a homogeneous mosaic.

Preferably, the cladding of the optical fibre contains elongate elements made of the first type of glass. Owing to this, the assumed refractive index of the cladding with a smaller tolerance is obtained.

Preferably, the effective refractive index of the core is not more than 0.05% higher than the first refractive index, which enables to increase the effective core area while maintaining the conditions for single-mode operation.

At least one active dopant is preferably a dopant selected from the group comprising: erbium, praseodymium, ytterbium, neodymium, thulium and holmium. Preferably, the core contains at least two active dopants, especially when the first type of glass is doped with at least the first active dopant, and the second type of glass is doped with at least the second active dopant. As a result, it is possible to produce an active optical fibre capable of simultaneous generation at different wavelengths $\lambda$.

Also preferably, the core additionally contains elongate elements made of a third type of glass being not doped with an active dopant, said elements defining the refractive index distribution.

Figure 2:
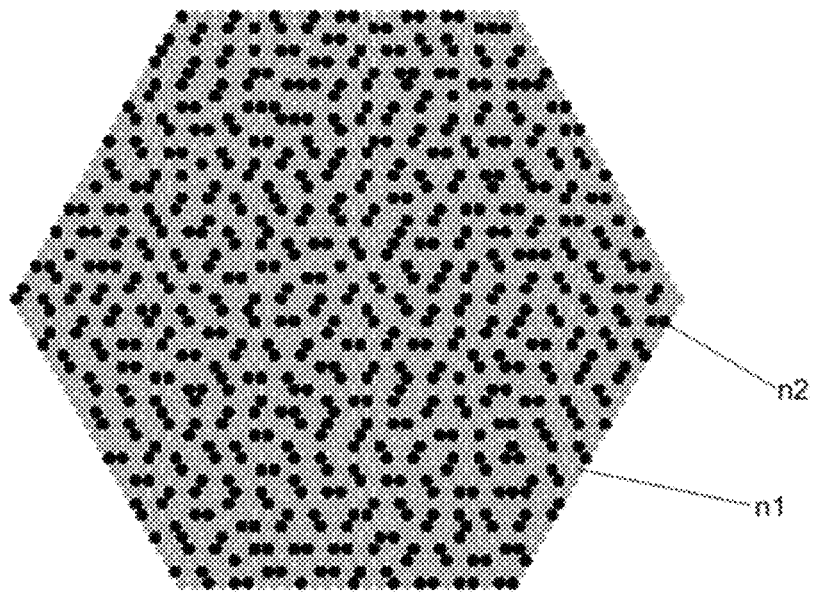
Figure 3:
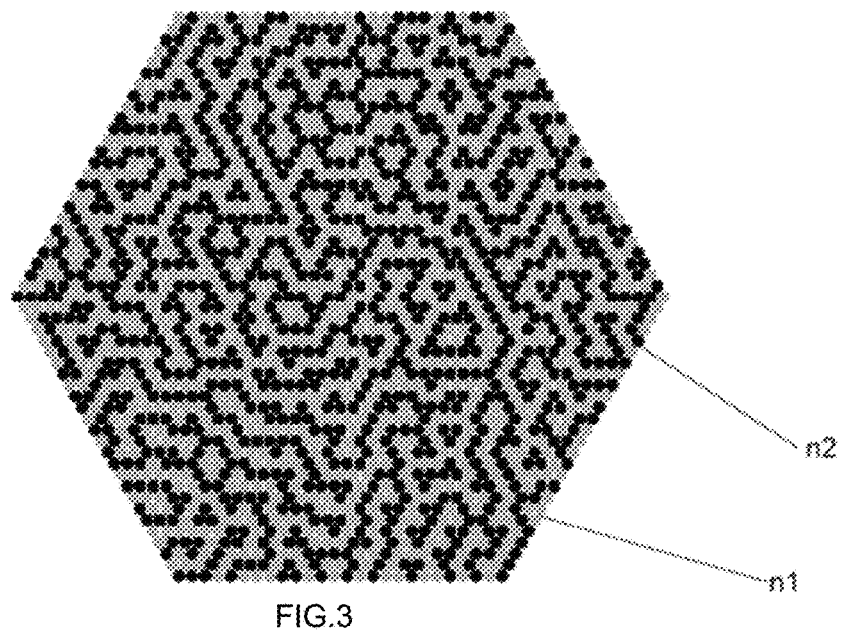
Figure 4:
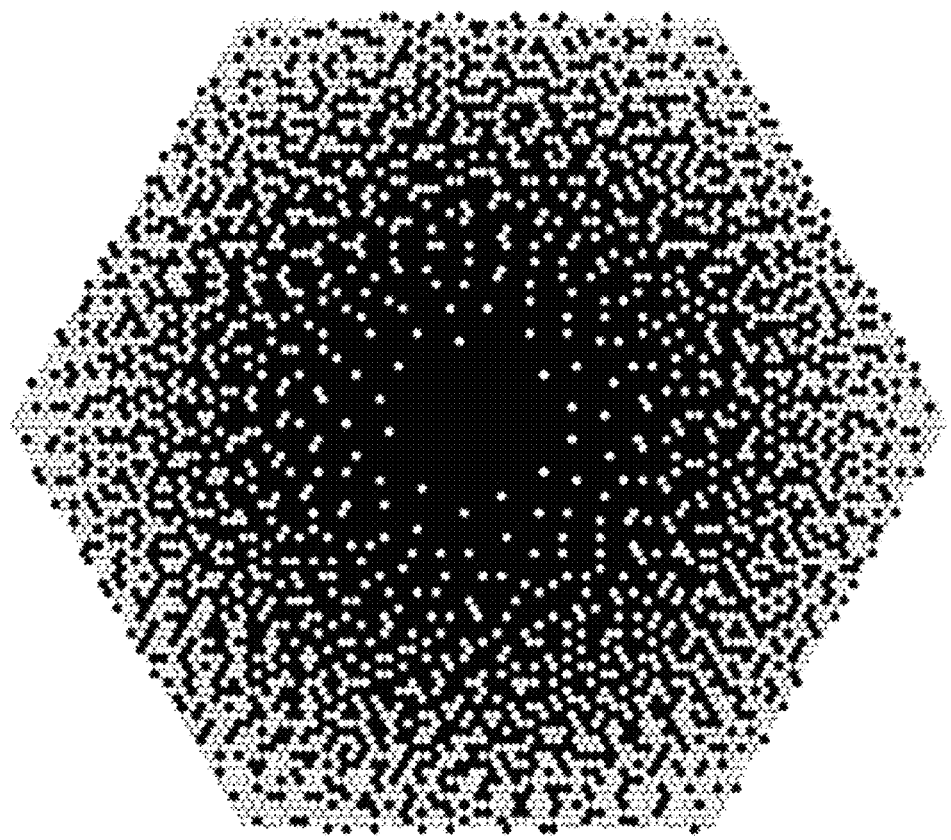
Figure 5:
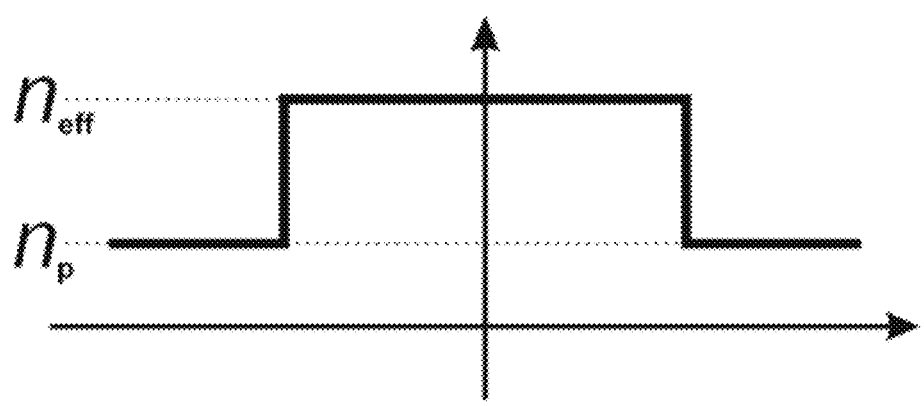
Figure 6:
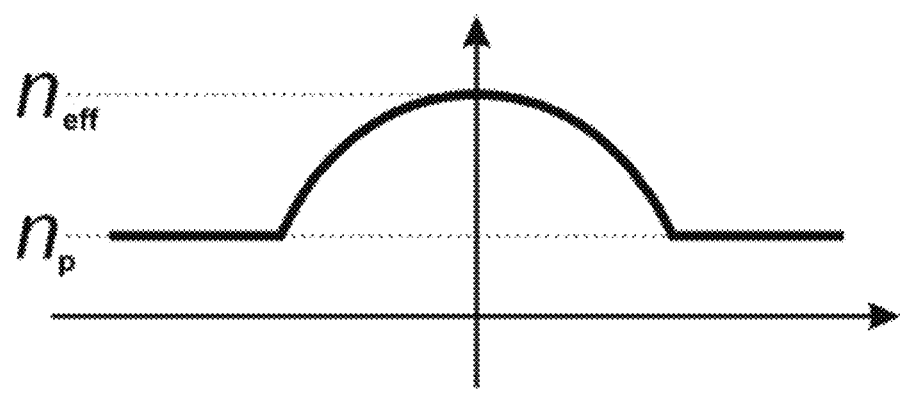

The subject-matter of the invention is shown in embodiments at the drawing, in which FIG. 1 shows a cross-sectional structure of the optical fibre core according to the invention, having a constant refractive index profile, FIG. 2 shows another cross-sectional structure of the optical fibre core according to the invention, having a constant refractive index profile, FIG. 3 shows yet another cross-sectional structure of the optical fibre core according to the invention, having a constant refractive index profile, FIG. 4 shows an alternative structure of the optical fibre according to the invention, having a gradient refractive index profile, FIG. 5 shows a refractive index profile in the cross-section of the optical fibre according to the invention at a constant refractive index profile in the core cross-section, and FIG. 6 shows a refractive index profile in the cross-section of the optical fibre according to the invention at a gradient refractive index profile in the core cross-section.

The method of manufacturing the optical fibre according to the invention starts with designing the optical fibre core structure. Fibres made of at least two types of glass are assumed as the basis. The first type of glass is not doped with an active dopant or at least is doped to a smaller extent than the second type.

As the active dopants rare earth ions are used, i.e. dopants including erbium, praseodymium, ytterbium, neodymium, thulium and holmium. Each of these dopants ensures generation at a different radiation wavelength $\lambda$. Therefore, the choice of dopant depends on design requirements and is associated with determination of the radiation wavelength $\lambda$.

Apart from doping with active dopants, other dopants can be also used, e.g., such as aluminium, germanium, boron or fluorine, which affect the glass refractive index value. It is also possible to use a multi-component glass, e.g. phosphate, silicate, fluoride, tellurium glass, thereby obtaining beneficial effects known to those skilled in the art from the publication entitled 'Rare-Earth-Doped Fiber Lasers and Amplifiers', Michel J. F. Digonnet, Stanford University California, 2001, 2nd edition.

The first and second type of glass are selected so as to obtain a set refractive index profile in the core after thinning the designed structure to the core size in the target fibre and of the core elongate components to transverse dimensions below $\lambda/5$. This means that the refractive index $n_1$ of the first type of glass should be lower than or equal to the lowest value of the assumed refractive index profile in the transverse plane of the core, and the second refractive index $n_2$ should be higher than or equal to the highest value of the assumed refractive index profile in the transverse plane of the core. In particular, if ensuring the single-mode operation of the optical fibre and maintaining the large core area are the only criteria, as the first type of glass having a lower refractive index the same glass as the one of the cladding is used, while as the second type of glass the same glass is used but subjected to doping with an active dopant, which not only allows for generation but also for an increase in the refractive index: $n_2 > n_1$.

Further, the rods made of the first type of glass and the second type of glass are prepared. Diameters of these rods generally range from 0.2 mm to 1.0 mm. Good results were obtained for a diameter of 0.6 mm. These rods are manufactured in the process of drawing the first type of glass and the second type of glass in a tower for drawing optical fibres, and then they are cut and cleaned. Convenient length is up to approx. 20 cm.

A structural preform is arranged from the prepared rods according to a predetermined structural design. It can be arranged manually but it is preferable to automate this process. The structural preform obtained thereby is prepared for thinning.

In the drawing process at the optical fibre tower, the intermediate preforms, i.e. so-called sub-preforms, are obtained from the structural preform. They are integrated glass rods having a diameter generally ranging from 1 mm to a few milimeters. The internal structure of the sub-preform corresponds to the design.

In some designs, especially these exhibiting a quasi-fractal structure of glass types, it is reasonable to manufacture a sub-preform corresponding only to a part of the design, and in the next step, a new structural preform is arranged from the sub-preform and is again subjected to drawing. This process can be repeated several times to obtain the assumed structure of the core and its components.

The target optical fibre is obtained in the drawing process in which the core is constituted by a previously obtained sub-preform. The sub-preform is placed in the cladding which can be constituted by various solutions known in the prior art. In the simplest case, it is a glass tube. It may also be a system of several concentric tubes or a cladding preform from glass rods free of active dopants, or a combination of these possibilities. The outer diameter of the cladding preform and the diameter of the sub-preform are selected so as to obtain, a set core diameter and a size of the components not exceeding λ/5 once the fibre is drawn. The active optical fibre structure in the core area corresponds to the arrangement of the structural preform made of glass rods. As a result of thinning by drawing, each of the rods turns into an elongate element of the core—thinned and elongated compared to its original dimensions. The elongate core elements form a compact bundle throughout its length. Drawing of the target fibre takes place at the optical fibre tower. The use of polymeric protective coatings during drawing reduces the risk of damage.

The method according to the invention was used to manufacture an active optical fibre for the band of λ=1 μm. Such wavelength of generated radiation is obtained when doping with ytterbium.

When preparing the structural preform, glass rods having a diameter of 0.6 mm, made of two types of glass were used. Glass of the first type: $SiO_2$ had refractive index $n_1$=1.4504174 and was not doped. Glass of the second type was doped with ytterbium: $SiO_2+Yb^{3+}$ in a proportion of 6000 ppm, and consequently it had refractive index $n_2$=1.4532491.

The rods were cut to a length of 120 mm and cleaned. Then, a first structural preform was arranged on a hexagon plan, on the diagonal of which 51 rods were laid, corresponding to the core structure shown in FIG. 1. In this structure, the rods of the second type are evenly distributed, with a constant concentration of 13.3%. The preform so obtained was prepared for thinning in the drawing process. In the drawing process, sub-preforms having a diameter of 2.4 mm were obtained. The sub-preform was placed in a glass tube having a diameter of 30 mm, was surrounded with undoped rods, and again was subjected to drawing using polymeric protective coatings, thereby obtaining a fibre having a diameter of 125 μm and a core having a diameter of 10 μm, i.e. 10λ. The core of this fibre has a diagonal having a length of 10 μm and contains components having refractive index $n_1$ and components having refractive index $n_2$ formed as a result of thinning of glass rods from which the structural preform was arranged. These components extend along the entire length of the fibre and, in cross-section, have a diameter of 196 nm, i.e. smaller than ⅕λ. Owing to this, light is neither refracted nor dispersed at their boundaries, and the core can be considered a medium having a uniform effective refractive index $n_{eff}$=1.4508799. The refractive index of the cladding is $n_p$=$n_1$=1.4504174. As a result, the relative difference between refractive indices of the cladding and the core was obtained at a level of 0.3 per mill (‰) and the core area of approx. 65 μm².

The optical fibre manufactured according to the method described above is a single-mode fibre and can be used in a high power laser.

Depending on the arrangement of rods in the structural preform which, after thinning in drawing processes, have transverse dimensions below ⅕ of radiation wavelength λ, various effective refractive indices of the core can be obtained. The structure shown in FIG. 2 for the same types of glass has the effective refractive index of 1.4513613, and the structure shown in FIG. 3 has the effective refractive index of 1.4518333.

Using the method according to the invention, it is even possible to obtain the relative $$\frac{n_{eff} - n_p}{n_{eff}}$$

difference of refractive index between the cladding and the core at a level of 5·10⁻⁵ and thus the possibility to obtain the single-mode core diameter of approx. 50 μm. Then, the number of elements on the diagonal of the core would be 250. It is allowed to use one type of rods of glass having a refractive index value below the refractive index value of the optical fibre cladding. By laying the glass rods of the structural preform evenly as shown in FIG. 1-3, a flat, constant refractive index profile of the core at its cross-section is obtained. Throughout the entire optical fibre, it resembles then a stepped function shown in FIG. 5. The difference between the cladding refractive index $n_p$ and the core refractive index $n_{eff}$ can be modified by changing the concentration of rods.

In the examples discussed, the active dopant is ytterbium, but it should be noted that the invention allows the use of any active dopant, in particular, other rare earth ions: erbium, praseodymium, ytterbium, neodymium, thulium and holmium, and also combinations of two or more of these dopants, e.g. in the system of co-dopant with specific dopant. An opportunity of using rods with various dopants is particularly preferable, for providing a freedom in designing the core structure of the active optical fibre.

The method according to the invention can be also used to manufacture optical fibres having refractive index profiles in the core cross-section being other than constant and being almost arbitrary within the range defined by the maximum and minimum values resulting from realizable refractive indices of glass. Due to the fact that the process parameters are selected so that the core consists of elongated elements having transverse dimensions lower than or equal to one fifth of the wavelength λ/5, the refractive index profile results directly from the function of rod concentration. For designing, so-called dithering algorithms, known from computer graphics, can be adapted. An example of a core structure realised on a hexagon plan with a diagonal of 101 elements and providing a gradient refractive index profile is shown in FIG. 4. A refractive index profile for the optical fibre having such a core structure is shown in FIG. 6.

It is worth noting that in the method according to the invention and in the optical fibre according to the invention, more types of glass can be used, providing more discrete refractive index values by means of which the profile across the core can be shaped.

Naturally, the method according to the invention and the optical fibre according to the invention can be used with structural preforms of the core having various shapes. A regular hexagon is convenient but regular polygons of other shapes, ellipses, circles can be also used, and even the structure shape can be selected matching the specific shape of the light source, which the active optical fibre is to cooperate with.

Using the structure comprising the rods doped with the first active dopant and the rods doped with the second active dopant and the rods of glass of the third type free of dopants, a core can be realised which allows for simultaneous generation at two or more radiation wavelengths with simultaneous pumping with various wavelengths of optical pumps. In such a scenario, an optical fibre having a core containing areas made of elongate elements with different doping types is designed. Using rods free of active dopants at the manufacturing stage, a refractive index distribution providing single-mode operation at both lengths is ensured. Due to the spatial spreading of active dopants, the types of active dopants responsible for the laser action at different wavelengths do not interact.

The invention claimed is:

1. A method of manufacturing an active optical fibre conducting and generating radiation having a wavelength λ, comprising:
    preparing a core sub-preform of glass doped with an active dopant; and
    drawing the core sub-preform along with a cladding preform to produce a core and a cladding,
    wherein preparing the core sub-preform comprises compiling a structural preform, the structural preform comprises:
        first glass rods made of a first type of glass having a first refractive index $n_1$; and
        second glass rods made of a second type of glass having a second refractive index $n_2$,
        wherein the first glass rods and the second glass rods are arranged according to a selected pattern to provide an assumed refractive index profile of the core,
        wherein the second refractive index $n_2$ is higher than or equal to the highest value of the assumed refractive index profile, and the value of the first refractive index $n_1$ is lower than or equal to the lowest value of the assumed refractive index profile in a core cross-section, and
        wherein the second type of glass comprises at least one active dopant,
    wherein drawing the core sub-preform comprises thinning the core sub-preform to obtain a core preform,
    wherein drawing the core sub-preform further comprises thinning the first glass rods and the second glass rods to reduce transverse dimensions of the first glass rods and the second glass rods to a value smaller than ⅕ of the wavelength λ.

2. The method according to claim 1, further comprises:
    cutting the core sub-preform into sections;
    compiling the sections into an intermediate structural preform; and
    drawing the intermediate structural preform to obtain a second core sub-preform.

3. The method according to claim 2, wherein the steps of cutting, compiling and drawing are repeated for more than once.

4. The method according to claim 1, wherein both the first type of glass and the second type of glass are doped with an active dopant, the second type of glass being stronger doped with the active dopant.

5. The method according to claim 1, wherein the assumed refractive index profile is constant throughout the core entire cross-section.

6. The method according to claim 5, wherein the cladding preform is made of cladding rods made of glass free of any active dopant, and wherein the cladding rods are arranged into a glass tube.

7. The method according to claim 6, wherein the first rods made of the first type of glass and the second rods made of the second type of glass are arranged in such a manner that an effective refractive index of the core differs from the first refractive index $n_1$ by 0.05% or less.

8. The method according to claim 1, wherein said at least one active dopant is at least one dopant selected from the group consisting of: erbium, praseodymium, ytterbium, neodymium, thulium and holmium.

9. The method according to claim 1, wherein at least two active dopants are used.

10. The method according to claim 9, wherein the first type of glass is doped with a first active dopant, and the second type of glass is doped with a second active dopant.

11. The method according to claim 10, wherein the structural preform further comprises a third type of glass, and the third type of glass is free of an active dopant.

12. An active optical fibre adapted to conduct and generate radiation having a wavelength λ, comprising:
    a cladding; and
    a core comprising at least one active dopant, wherein the core comprises:
        first elongate elements made of a first type of glass having a first refractive index $n_1$; and
        second elongate elements made of a second type of glass having a second refractive index $n_2$,
        wherein the first elongate elements and the second elongate elements are oriented along the optical fibre and form a compact bundle,
        wherein transverse dimensions of the first and second elongate elements are smaller than ⅕ of the wavelength λ,
        wherein the second refractive index $n_2$ has a value higher than or equal to the highest value of a refractive index profile in a cross-section of the core, and the first refractive index $n_1$ has a value lower than or equal to the lowest value of the refractive index profile in the cross-section of the core, and
        wherein at least the second type of glass is doped with at least one active dopant.

13. The active optical fibre according to claim 12, wherein both the first type of glass and the second type of glass are doped with an active dopant, the second type of glass being more strongly doped with the active dopant.

14. The active optical fibre according to claim 12, wherein said at least one active dopant comprises at least one selected from the group consisting of: erbium, praseodymium, ytterbium, neodymium, thulium and holmium.

15. The active optical fibre according to claim 12, wherein the first elongate elements made of the first type of glass and the second elongate elements made of the second type of glass are arranged into a homogeneous mosaic.

16. The active optical fibre according to claim 12, wherein the cladding comprises cladding elongate elements made of the first type of glass.

17. The active optical fibre according to claim 16, wherein an effective refractive index of the core is not more than 0.05% higher than the first refractive index $n_1$.

18. The active optical fibre according to claim 12, wherein the core contains at least two active dopants.

19. The active optical fibre according to claim 18, wherein the first type of glass is doped with at least a first active dopant, and the second type of glass is doped with at least a second active dopant.

20. The active optical fibre according to claim 19, wherein the core further comprises third elongate elements made of a third type of glass, and the third type of glass is free from an active dopant.

* * * * *